(12) United States Patent
Liu et al.

(10) Patent No.: US 11,772,995 B2
(45) Date of Patent: Oct. 3, 2023

(54) TOTAL NITROGEN REMOVAL DEVICE FOR SEWAGE AND METHOD FOR OPERATING THE SAME

(71) Applicant: Greentech Environment Co., Ltd., Beijing (CN)

(72) Inventors: Mu Liu, Beijing (CN); Mengyuan Duan, Beijing (CN); Zehua Li, Beijing (CN); Kai Sun, Beijing (CN); Yingqiang Su, Beijing (CN); Xikun Zhu, Beijing (CN); Huiming Han, Beijing (CN); Xiaofeng Lin, Beijing (CN); Jin Li, Beijing (CN)

(73) Assignee: Greentech Environment Co., Ltd., Beijing (CN)

(*) Notice: Subject to any disclaimer, the term of this patent is extended or adjusted under 35 U.S.C. 154(b) by 0 days.

(21) Appl. No.: 18/190,083

(22) Filed: Mar. 25, 2023

(65) Prior Publication Data
US 2023/0227341 A1 Jul. 20, 2023

(30) Foreign Application Priority Data
Jun. 13, 2022 (CN) .......................... 202210659096.7

(51) Int. Cl.
*C02F 3/30* (2023.01)
*C02F 3/20* (2023.01)
(Continued)

(52) U.S. Cl.
CPC ................ *C02F 3/30* (2013.01); *C02F 3/208* (2013.01); *C02F 2101/16* (2013.01);
(Continued)

(58) Field of Classification Search
CPC ........ C02F 2101/16; C02F 3/30; C02F 3/302; C02F 3/208; C02F 2103/005; C02F 2203/006
(Continued)

(56) References Cited

U.S. PATENT DOCUMENTS

2021/0253460 A1 8/2021 Houweling et al.

FOREIGN PATENT DOCUMENTS

| CN | 201746426 U | 2/2011 |
| CN | 102139952 A | 8/2011 |

(Continued)

OTHER PUBLICATIONS

Zhang et al, English machine translation CN 107892437 A (Year: 2018).*

*Primary Examiner* — Claire A Norris

(57) ABSTRACT

A total nitrogen (TN) removal device for sewage and its operation method. The TN removal device includes a denitrification tank, a supplementary reaction zone filled with aerobic granular sludge and a sedimentation and separation zone. The supplementary reaction zone and the sedimentation and separation zone are arranged inside the denitrification tank, and communicated through a three-phase separator. The sedimentation and separation zone is located above the supplementary reaction zone. A top of the sedimentation and separation zone is greater than its bottom. A membrane aerated biofilm reactor (MABR) assembly is arranged in a space formed by outer walls of the sedimentation and separation zone and supplementary reaction zone and an inner chamber of the denitrification tank. A side wall of the denitrification tank is provided with a chemical oxygen demand (COD) detector and a nitrate nitrogen detector.

8 Claims, 2 Drawing Sheets

(51) Int. Cl.
*C02F 101/16* (2006.01)
*C02F 103/00* (2006.01)

(52) U.S. Cl.
CPC .. *C02F 2103/005* (2013.01); *C02F 2203/006* (2013.01); *C02F 2209/08* (2013.01); *C02F 2209/15* (2013.01); *C02F 2209/16* (2013.01); *C02F 2209/40* (2013.01)

(58) Field of Classification Search
USPC .................................................. 210/605, 903
See application file for complete search history.

(56) References Cited

FOREIGN PATENT DOCUMENTS

| | | | |
|---|---|---|---|
| CN | 107892437 | A | 4/2018 |
| CN | 111977786 | A | 11/2020 |
| WO | 2022072270 | A1 | 4/2022 |

\* cited by examiner

TOTAL NITROGEN REMOVAL DEVICE FOR SEWAGE AND METHOD FOR OPERATING THE SAME

CROSS-REFERENCE TO RELATED APPLICATIONS

This application claims the benefit of priority from Chinese Patent Application No. 202210659096.7, filed on Jun. 13, 2022. The content of the aforementioned application, including any intervening amendments thereto, is incorporated herein by reference in its entirety.

TECHNICAL FIELD

The present application relates to sewage treatment, in particular to a total nitrogen (TN) removal device for sewage and a method for operating the same.

BACKGROUND

The membrane aerated biofilm reactor (MABR) is an emerging Biofilm combination technology, where the "membrane" is usually a hollow fiber membrane with flexible and adjustable shape, and the hollow fiber membrane is covered by the biofilm. A liquid phase composed of the raw sewage to be treated is located outside the biofilm. The hollow fiber membrane surface is used not only for aeration, but also as a carrier of the biofilm. In the practical use, oxygen diffuses into the biofilm through an interface between the hollow fiber membrane and biofilm, so that regarding the biofilm, an aerobic zone, a facultative anaerobic zone and an anaerobic zone are formed from inside to outside. The pollutants in the raw sewage reversely enter the biofilm through an interface between biofilm and liquid phase, and thus an $A^2O$ (Anaerobic-Anoxic-Oxic) reaction system is established. The MABR overcomes the problems of the traditional biofilter such as poor carrier performance, small specific surface area and easy shedding of biofilm, and is suitable for the treatment of volatile pollutants with high oxygen demand.

Aerobic granular sludge (AGS) is a kind of granular activated sludge which is formed by the self-coagulation of microorganisms and adsorption of extracellular polymeric substances (EPS, biological gel such as protein, polysaccharide, grease and humic acid). The AGS has strong sludge settleability, low content of suspended substance in effluent, regular and smooth appearance, compact microbial structure and high sludge load, and is not prone to sludge bulking. The AGS is composed of aerobic bacteria, facultative anaerobic bacteria and anaerobic bacteria from the surface to the core, which can realize synchronous anoxic-aerobic reaction in the aeration state.

By means of the combination of MABR and AGS, nitrification, short-cut denitrification and anaerobic ammoxidation can be carried out simultaneously. Unfortunately, there is no research about the combination of MABR and AGS to design a reasonable device and process to realize the sewage denitrification with low energy consumption.

Accordingly, it is urgent to provide a device and method integrating MABR and AGS to realize the nitrogen removal with low energy consumption.

SUMMARY

To solve the foregoing technical problems, the present disclosure provides a total nitrogen (TN) removal device for sewage and an operation method thereof.

In a first aspect, the disclosure provides a TN removal device for sewage, comprising:
a denitrification tank;
a sedimentation and separation zone; and
a supplementary reaction zone;
wherein the supplementary reaction zone and the sedimentation and separation zone are arranged inside the denitrification tank; the sedimentation and separation zone is located above the supplementary reaction zone, and is communicated with the supplementary reaction zone through a three-phase separator; the denitrification tank is configured such that sewage therein is allowed to flow into the supplementary reaction zone; and sewage in the sedimentation and separation zone after nitrogen removal is allowed to flow out of the denitrification tank;
a top surface of the sedimentation and separation zone is sealed; a diameter of the top surface of the sedimentation and separation zone is greater than a diameter of a bottom surface of the sedimentation and separation zone; and the supplementary reaction zone is filled with aerobic granular sludge; and
a membrane aerated biofilm reactor (MABR) assembly is arranged in a space formed by the outer side wall of the sedimentation and separation zone, the outer side wall of the supplementary reaction zone and the inner chamber of the denitrification tank; and a side wall of the denitrification tank is provided with an online chemical oxygen demand (COD) detector and an online nitrate nitrogen detector.

In some embodiments, the TN removal device further comprises:
an anaerobic tank;
wherein an inside of the anaerobic tank is filled with activated sludge, and is provided with a stirrer; a top of a side wall of the anaerobic tank is provided with a first water inlet channel; a bottom of the side wall of the anaerobic tank is provided with a return channel; and the anaerobic tank is connected to the denitrification tank respectively through the first water inlet channel and the return channel.

In some embodiments, an overflow weir is arranged at an upper part of an inner chamber of the sedimentation and separation zone; an end of the overflow weir protrudes from a side wall of the sedimentation and separation zone; and sewage after nitrogen removal is allowed to flow out of the denitrification tank through the overflow weir.

In some embodiments, a flow guide pipe is arranged at an outer side wall of the sedimentation and separation zone and an outer side wall of the supplementary reaction zone; a water inlet of the flow guide pipe is arranged in a space formed by the outer side wall of the sedimentation and separation zone and an inner chamber of the denitrification tank; the water inlet of the flow guide pipe is higher than a water outlet of the overflow weir; and a water outlet of the flow guide pipe is communicated with a bottom of the supplementary reaction zone.

In some embodiments, the MABR assembly comprises a top plate, a plurality of MABR membranes and a bottom plate; two ends of each of the plurality of MABR membranes are fixed on the top plate and the bottom plate, respectively; the bottom plate is fixedly provided at a bottom of the denitrification tank; the top plate is fixedly provided at a top of the denitrification tank and/or the outer side wall of the supplementary reaction zone.

In some embodiments, the TN removal device further comprises a first aerator, a second aerator and a third aerator;

the first aerator is connected to the bottom plate of the MABR assembly; an air supply pipe of the second aerator is arranged at a bottom of the inner chamber of the denitrification tank; and an air supply pipe of the third aerator is arranged at the bottom of the supplementary reaction zone.

In some embodiments, the TN removal device further comprises:
a second water inlet channel; and
a third water inlet channel;
wherein the second water inlet channel is communicated with the bottom of the denitrification tank; the third water inlet channel is communicated with the second water inlet channel and the anaerobic tank; and the first water inlet channel is communicated with the second water inlet channel.

In some embodiments, the first water inlet channel is provided with a first inlet valve; the second water inlet channel is provided with a second inlet valve; the third water inlet channel is provided with a third inlet valve; and the return channel is provided with a return valve.

In some embodiments, the second water inlet channel is provided with a water feed pump; the water feed pump is arranged before a connection between the second water inlet channel and the third water inlet channel along a flow direction in the second water inlet channel; and a return pump is provided on the return channel.

In a second aspect, the disclosure provides an operation method of the above-mentioned TN removal device, comprising:
(S1) subjecting raw sewage to reaction in the denitrification tank to obtain a preliminarily-processed sewage;
(S2) allowing the preliminarily-processed sewage to flow into the supplementary reaction zone for supplementary reaction; and forming, by gravity, an upward flow of the preliminarily-processed sewage; and
(S3) allowing the upward flow to pass through the three-phase separator to remove air bubbles and a part of the aerobic granular sludge from the by, enter the sedimentation and separation zone to remove the rest of the aerobic granular sludge, and flow out of the denitrification tank, so as to complete removal of total nitrogen.

In some embodiments, the water feed pump and the first aerator are in continuous operation; chemical oxygen demand (COD) and a nitrate nitrogen concentration of the raw sewage in the denitrification tank are recorded by the online COD detector and the online nitrate nitrogen detector at a preset frequency; and a ratio of the COD to the nitrate nitrogen concentration is calculated; and
when the TN removal device is turned on, the second aerator is in an off state, and the third aerator is under operation; if the ratio of the COD to the nitrate nitrogen concentration is equal to or larger than 4, the second aerator is started, and the third aerator is stopped; and if the ratio of the COD to the nitrate nitrogen concentration is lowered to 3.5 or less, the second aerator is stopped, and the third aerator is started.

In some embodiments, when the second aerator is in an operation state, the first inlet valve, the third inlet valve, and the return valve are opened, the return pump and the stirrer are started, and the second inlet valve is closed; and
when the second aerator is in the off state, the second inlet valve is opened, the first inlet valve, the third inlet valve, and the return valve are closed, and the return pump and the stirrer are stopped.

In some embodiments, when the ratio of the COD to the nitrate nitrogen concentration is equal to or lower than 2.0, an aeration rate of the first aerator is reduced; and when the ratio of the COD to the nitrate nitrogen concentration rises to 2.5 or more, the aeration rate of the first aerator is adjusted to rise to a preset value.

In an embodiment, the step (S1) is performed through steps of:
opening the second inlet valve and starting the water feed pump to feed the raw sewage to the denitrification tank for reaction, wherein the first aerator and the third aerator are under operation, and the second aerator is in an off state; recording, by the online COD detector and the online nitrate nitrogen detector, COD and a nitrate nitrogen concentration of the raw sewage in the denitrification tank at a preset frequency; and calculating a ratio of the COD to the nitrate nitrogen concentration;
wherein when the ratio of the COD to the nitrate nitrogen concentration is equal to or larger than 4, the second aerator, the return pump and the stirrer are started, the first inlet valve, the third inlet valve, and the return valve are opened, and the second inlet valve is closed;
when the ratio of the COD to the nitrate nitrogen concentration is lowered to 3.5 or less, the second aerator, the return pump and the stirrer are stopped, the first inlet valve, the third inlet valve, and the return valve are closed, the third aerator is started, and the second inlet valve is opened;
when the ratio of the COD to the nitrate nitrogen concentration is lowered to 2.0 or less, an aeration rate of the first aerator is reduced; and
when the ratio of the COD to the nitrate nitrogen concentration rises back to 2.5 or more, the aeration rate of the first aerator is adjusted to rise to a preset value.

Compared to the prior art, this application has the following beneficial effects.

(1) Compared with the existing $A^2O$ short-cut denitrification-anaerobic ammonium oxidation device, the TN removal device provided herein can ensure that nitrification, shortcut denitrification and anaerobic ammonium oxidation are carried out synchronously. Furthermore, the TN removal device does not require continuous sludge recycle for the anaerobic zone, high-power stirring for sludge mixed liquid and continuous aeration for the sludge mixed liquid. Due to the bubbleless aeration mode of the biofilm on the surface of MABR, the TN removal device provided herein is energy-saving.

(2) By means of the TN removal device provided herein, the ratio of the COD concentration to the nitrate nitrogen concentration can be effectively controlled only by starting and stopping the aerators and adjusting the aeration rate, and the short-cut denitrification can be smoothly carried out.

(3) By means of the TN removal device provided herein, due to the sedimentation effect of the aerobic granular sludge at a tail end, a lower effluent turbidity can be ensured while realizing the treatment of sewage by continuous water feeding.

BRIEF DESCRIPTION OF THE DRAWINGS

The accompanying drawings form a part of the specification, in which some embodiments of the disclosure are illustrated.

The accompany drawings needed in the description of the embodiments of the disclosure will be briefly described below to explain the technical solutions of the present disclosure more clearly. Obviously, presented in the accompany drawings are merely some embodiments of the present disclosure, and other drawings can be obtained by those skilled in the art based on the drawings provided herein without paying creative effort.

Figure 1:
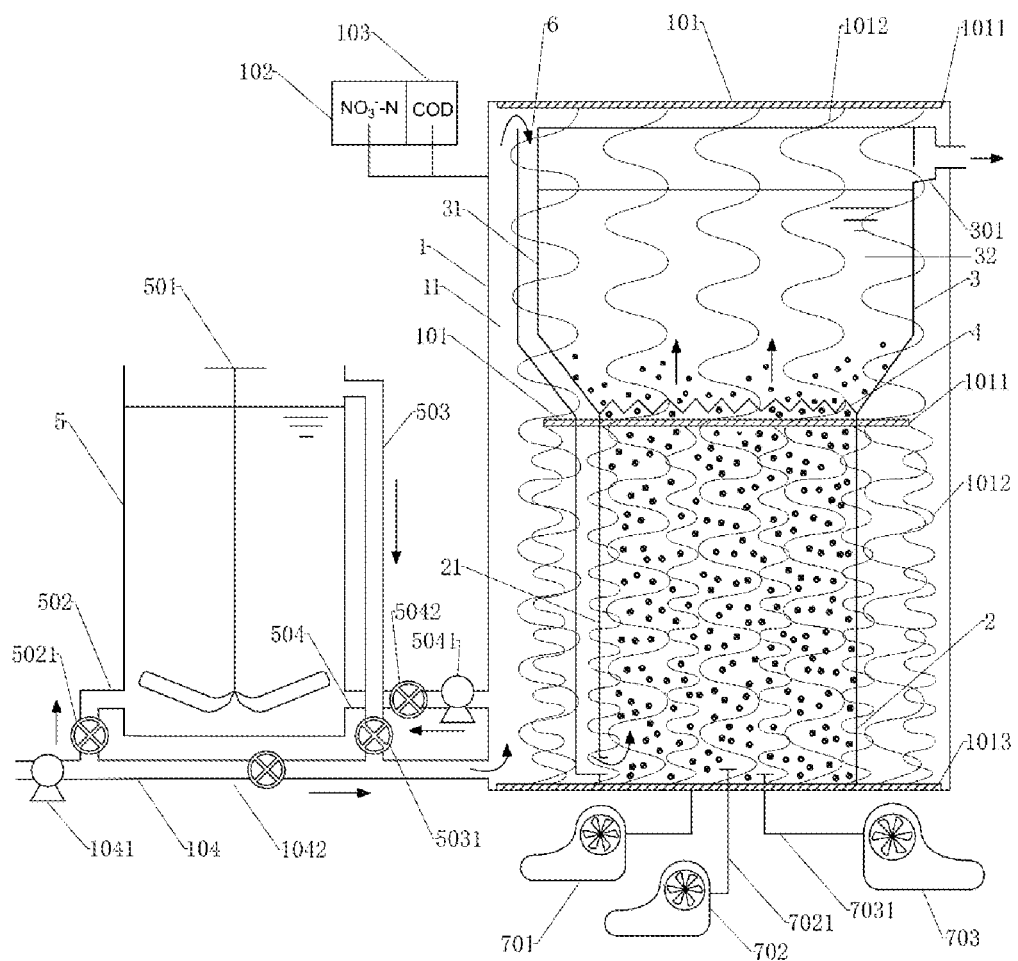
FIG. 1 schematically depicts a structure of a TN removal device for sewage according to Embodiment 1 of the present disclosure.

In the drawings: 1, denitrification tank; 101, MABR assembly; 1011, top plate; 1012, MABR membrane; 1013, bottom plate; 102, nitrate nitrogen detector; 103, online chemical oxygen demand (COD) detector; 104, second water inlet channel; 1041, water feed pump; 1042, second inlet valve; 2, supplementary reaction zone; 3, sedimentation and separation zone; 301, overflow weir; 4, three-phase separator; 5, anaerobic tank; 501, stirrer; 502, third water inlet channel; 5021, third inlet valve; 503, first water inlet channel; 5031, first inlet valve; 504, return pipe; 5041, return pump; 5042, return valve; 6, flow guide pipe; 701, first aerator; 702, second aerator; 7021, air supply pipe of the second aerator; 703, third aerator; 7031, air supply pipe of the third aerator; 11, inner chamber of denitrification tank; 21, outer side wall of supplementary reaction zone; 31, outer side wall of sedimentation and separation zone; and 32, inner chamber of sedimentation and separation zone.

DETAILED DESCRIPTION OF EMBODIMENTS

The disclosure will be described completely and clearly below with reference to the accompanying drawings and embodiments to make the object, technical solutions, and beneficial effects of the present disclosure clearer. It should be noted that the features of various embodiments may be combined in the absence of contradiction.

Technical solutions of the present disclosure and the prior art will be described below with reference to the accompany drawings and embodiments to facilitate the understanding. Obviously, provided below are merely some embodiments of the disclosure, which are not intended to limit the disclosure.

Embodiment 1

Provided is a total nitrogen (TN) removal device for sewage.

Figure 2:
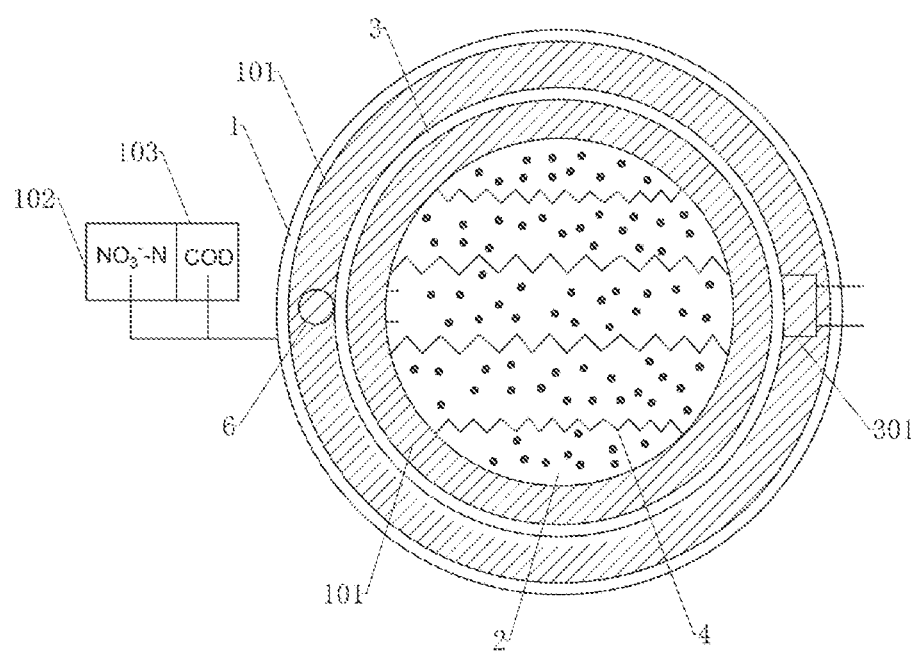
FIG. 2 is a top view of the TN removal device according to Embodiment 1 of the present disclosure.

Referring to FIGS. 1 and 2, the TN removal device includes a denitrification tank 1, a supplementary reaction zone 2, a sedimentation and separation zone 3 and an anaerobic tank 5.

The supplementary reaction zone 2 and the sedimentation and separation zone 3 are arranged inside the denitrification tank 1. The sedimentation and separation zone 3 is located above the supplementary reaction zone 2, and is communicated with the supplementary reaction zone 2 through a three-phase separator 4. An overflow weir 301 is arranged at an upper part of an inner chamber 32 of the sedimentation and separation zone 3. An end of the overflow weir 301 protrudes from a side wall of the sedimentation and separation zone 3. Sewage after nitrogen removal is allowed to flow out of the denitrification tank 1 through the overflow weir 301.

A flow guide pipe 6 is arranged at an outer side wall 31 of the sedimentation and separation zone 3 and an outer side wall 21 of the supplementary reaction zone 2. A water inlet of the flow guide pipe 6 is arranged at a space formed by the outer side wall 31 of the sedimentation and separation zone 3 and an inner chamber 11 of the denitrification tank 1. The water inlet of the flow guide pipe is higher than a water outlet of the overflow weir 301. A water outlet of the flow guide pipe 6 is communicated with a bottom of the supplementary reaction zone 2.

A top surface of the sedimentation and separation zone 3 is sealed. A diameter of the top surface of the sedimentation and separation zone 3 is greater than a diameter of a bottom surface of the sedimentation and separation zone 3. The supplementary reaction zone 2 is filled with aerobic granular sludge.

A membrane aerated biofilm reactor (MABR) membrane assembly 101 is arranged in a space formed by the outer side wall 31 of the sedimentation and separation zone 3, the outer side wall 21 of the supplementary reaction zone 2 and the inner chamber 11 of the denitrification tank 1. A side wall of the denitrification tank 1 is provided with an online chemical oxygen demand (COD) detector 103 and an online nitrate nitrogen detector 102.

The MABR membrane assembly 101 includes a top plate 1011, a plurality of MABR membranes 1012 and a bottom plate 1013. Two ends of each of the plurality of MABR membranes 1012 are fixed on the top plate 1011 and the bottom plate 1013, respectively. The bottom plate 1013 is fixedly provided at a bottom of the denitrification tank 1. The top plate 1011 is fixed at a top of the denitrification tank 1 and/or the outer side wall 21 of the supplementary reaction zone 2.

The TN removal device further includes a first aerator 701, a second aerator 702 and a third aerator 703. The first aerator 701 is connected to the bottom plate of the MABR membrane assembly 101. An air supply pipe 7021 of the second aerator 702 is arrange at a bottom of the inner chamber 11 of the denitrification tank 1. An air supply pipe 7031 of the third aerator 703 is arranged at the bottom of the supplementary reaction zone 2.

An inside of the anaerobic tank 5 is filled with activated sludge, and is provided with a stirrer 501. A top of a side wall of the anaerobic tank 5 is provided with a first water inlet channel 503. A bottom of the side wall of the anaerobic tank 5 is provided with a return channel 504. The anaerobic tank 5 is connected to the denitrification tank 1 through the first water inlet channel 503 and the return channel 504.

The TN removal device further includes a second water inlet channel 104 and a third water inlet channel 502. The second water inlet channel 104 is communicated with the bottom of the denitrification tank 1. The third water inlet channel 502 is communicated with the second water inlet channel 104 and the anaerobic tank 5. The first water inlet channel 503 is communicated with the second water inlet channel 104.

The third water inlet channel 502 is provided with a third inlet valve 5021. The second water inlet channel 104 is provided with a second inlet valve 1042. The first water inlet channel 503 is provided with a first inlet valve 5031. The return channel 504 is provided with a return valve 5042.

The second water inlet channel 104 is provided with a water feed pump 1041. The water feed pump 1041 is arranged before a connection between the second water inlet channel 104 and the third water inlet channel 502 along a flow direction in the second water inlet channel 104. A return pump 5041 is provided on the return channel 504.

Embodiment 2

Provided is an operation method of the TN removal device of Embodiment 1, including the following steps.

(S1) The water feed pump 1041 and the second inlet valve 1042 are started to feed the raw sewage to the denitrification tank 1 for reaction, where the first aerator 701 and the third aerator 703 are under operation, and the second aerator 702 is in an off state. COD and nitrate nitrogen concentration of raw sewage in the denitrification tank 1 are recorded at a preset frequency by the online COD detector 103 and the nitrate nitrogen detector 102. A ratio of the COD to the nitrate nitrogen concentration is calculated.

(S2) The raw sewage after reaction flows into the supplementary reaction zone 2 through the flow guide pipe 6 for supplementary reaction. An upward flow of the raw sewage is formed by gravity.

(S3) The upward flow is allowed to pass through the three-phase separator 4 to remove air bubbles and aerobic granular sludge from the upward flow. Then, the upward flow enters the sedimentation and separation zone 3 to remove the rest of the aerobic granular sludge, and flows out of the denitrification tank 1, so as to complete removal of total nitrogen.

When the ratio of the COD to the nitrate nitrogen concentration is equal to or larger than 4, the second aerator 703, the return pump 5041 and the stirrer 501 are started, the first inlet valve 5031, the third inlet valve 5021, and the return valve 5042 are opened, and the second inlet valve 1042 is closed.

When the ratio of the COD to the nitrate nitrogen concentration is lowered to 3.5 or less, the second aerator 702, the return pump 5041 and the stirrer 501 are stopped, the first inlet valve 5031, the third inlet valve 5021, and the return valve 5042 are closed, the third aerator 703 is started, and the second inlet valve 1042 is opened.

When the ratio of the COD to the nitrate nitrogen concentration is lowered to 2.0 or less, an aeration rate of the first aerator 701 is reduced.

When the ratio of the COD to the nitrate nitrogen concentration rises back to 2.5 or more, the aeration rate of the first aerator 701 is adjusted to rise to a preset value.

In the actual use, devices such as pumps, valves and instruments are controlled by a programmable logic controller (PLC), and the whole treatment process can be automatically completed through a preset program.

As used herein, terms "first" and "second" are merely intended to distinguish similar objects, and do not necessarily require or imply any particular relationship or sequence therebetween. The term "include", "comprise" or any other variant is intended to cover non-exclusive inclusion such that a process, method, article, or device that includes a series of elements includes not only those elements, but also other elements that are not explicitly listed or inherent to the process, method, article or device. Without further limitation, the statement "includes a." does not preclude the presence of additional identical elements in the process, method, article, or apparatus including such elements.

Described above are merely illustrative of the disclosure, and are not intended to limit the disclosure. It should be understood that any changes, modifications and replacements made by those skilled in the art without departing from the spirit of the disclosure shall fall within the scope of the disclosure defined by the appended claims.

What is claimed is:

1. A total nitrogen (TN) removal device for sewage, comprising:
a denitrification tank;
a sedimentation and separation zone;
a supplementary reaction zone;
a first aerator;
a second aerator; and
a third aerator;

wherein the supplementary reaction zone and the sedimentation and separation zone are arranged inside the denitrification tank; the sedimentation and separation zone is located above the supplementary reaction zone, and is communicated with the supplementary reaction zone through a three-phase separator; the denitrification tank is configured such that sewage therein is allowed to flow into the supplementary reaction zone; an overflow weir is arranged at an upper part of an inner chamber of the sedimentation and separation zone; an end of the overflow weir protrudes from a side wall of the sedimentation and separation zone; and the overflow weir is configured to enable sewage after nitrogen removal to flow out of the denitrification tank;

one part of a flow guide pipe is arranged at an outer side wall of the sedimentation and separation zone, and the other part of the flow guide pipe is arranged at an outer side wall of the supplementary reaction zone; a water inlet of the flow guide pipe is arranged in a space formed by the outer side wall of the sedimentation and separation zone and an inner chamber of the denitrification tank; the water inlet of the flow guide pipe is higher than a water outlet of the overflow weir; and a water outlet of the flow guide pipe is communicated with a bottom of the supplementary reaction zone;

a top surface of the sedimentation and separation zone is sealed; a diameter of the top surface of the sedimentation and separation zone is greater than a diameter of a bottom surface of the sedimentation and separation zone; and the supplementary reaction zone is filled with aerobic granular sludge;

a membrane aerated biofilm reactor (MABR) assembly is arranged in a space formed by the outer side wall of the sedimentation and separation zone, the outer side wall of the supplementary reaction zone and the inner chamber of the denitrification tank; and a side wall of the denitrification tank is provided with an online chemical oxygen demand (COD) detector and an online nitrate nitrogen detector;

the MABR assembly comprises a top plate, a plurality of MABR membranes and a bottom plate; two ends of each of the plurality of MABR membranes are fixed on the top plate and the bottom plate, respectively; the bottom plate is fixedly provided at a bottom of the denitrification tank; the top plate is fixedly provided at a top of the denitrification tank and/or the outer side wall of the supplementary reaction zone; and the first aerator is connected to the bottom plate of the MABR assembly; an air supply pipe of the second aerator is arranged at a bottom of the inner chamber of the denitrification tank; and an air supply pipe of the third aerator is arranged at the bottom of the supplementary reaction zone.

2. The TN removal device of claim 1, further comprising:
an anaerobic tank;
wherein an inside of the anaerobic tank is filled with activated sludge, and is provided with a stirrer; a top of a side wall of the anaerobic tank is provided with a first water inlet channel; a bottom of the side wall of the anaerobic tank is provided with a return channel; and the anaerobic tank is connected to the denitrification tank respectively through the first water inlet channel and the return channel.

3. The TN removal device of claim 2, further comprising:
a second water inlet channel; and
a third water inlet channel;

wherein the second water inlet channel is communicated with the bottom of the denitrification tank; the third water inlet channel is communicated with the second water inlet channel and the anaerobic tank; and the first water inlet channel is communicated with the second water inlet channel;

the first water inlet channel is provided with a first inlet valve; the second water inlet channel is provided with a second inlet valve; the third water inlet channel is provided with a third inlet valve; and the return channel is provided with a return valve; and the second water inlet channel is provided with a water feed pump; the water feed pump is arranged before a connection between the second water inlet channel and the third water inlet channel along a flow direction in the second water inlet channel; and a return pump is provided on the return channel.

4. An operation method of the TN removal device of claim 3, comprising:
(S1) subjecting raw sewage to reaction in the denitrification tank to obtain a preliminarily-processed sewage;
(S2) allowing the preliminarily-processed sewage to flow into the supplementary reaction zone for supplementary reaction; and
(S3) allowing the preliminarily-processed sewage to pass through the three-phase separator to remove air bubbles and a part of the aerobic granular sludge from the preliminarily-processed sewage, enter the sedimentation and separation zone to remove the rest of the aerobic granular sludge, and flow out of the denitrification tank, so as to complete removal of total nitrogen.

5. The operation method of claim 4, wherein chemical oxygen demand (COD) and a nitrate nitrogen concentration of the raw sewage in the denitrification tank are recorded by the online COD detector and the online nitrate nitrogen detector at a preset frequency; and a ratio of the COD to the nitrate nitrogen concentration is calculated; and when the TN removal device is turned on, the water pump and the first aerator are in continuous operation, the second aerator is in an off state, and the third aerator is under operation; if the ratio of the COD to the nitrate nitrogen concentration is equal to or larger than 4, the second aerator is started, and the third aerator is stopped; and if the ratio of the COD to the nitrate nitrogen concentration is lowered to 3.5 or less, the second aerator is stopped, and the third aerator is started.

6. The operation method of claim 5, wherein when the second aerator is in an operation state, the first inlet valve, the third inlet valve, and the return valve are opened, the return pump and the stirrer are started, and the second inlet valve is closed; and when the second aerator is in the off state, the second inlet valve is opened, the first inlet valve, the third inlet valve, and the return valve are closed, and the return pump and the stirrer are stopped.

7. The operation method of claim 5, wherein when the ratio of the COD to the nitrate nitrogen concentration is equal to or lower than 2.0, an aeration rate of the first aerator is reduced; and when the ratio of the COD to the nitrate nitrogen concentration rises to 2.5 or more, the aeration rate of the first aerator is adjusted to rise to a preset value.

8. The operation method of claim 4, wherein the step (S1) is performed through steps of:

opening the second inlet valve and starting the water feed pump to feed the raw sewage to the denitrification tank for reaction, wherein the first aerator and the third aerator are under operation, and the second aerator is in an off state; recording, by the online COD detector and the online nitrate nitrogen detector, COD and a nitrate nitrogen concentration of the raw sewage in the denitrification tank at a preset frequency; and calculating a ratio of the COD to the nitrate nitrogen concentration;

wherein when the ratio of the COD to the nitrate nitrogen concentration is equal to or larger than 4, the second aerator, the return pump and the stirrer are started, the first inlet valve, the third inlet valve, and the return valve are opened, and the second inlet valve is closed;

when the ratio of the COD to the nitrate nitrogen concentration is lowered to 3.5 or less, the second aerator, the return pump and the stirrer are stopped, the first inlet valve, the third inlet valve, and the return valve are closed, the third aerator is started, and the second inlet valve is opened;

when the ratio of the COD to the nitrate nitrogen concentration is lowered to 2.0 or less, an aeration rate of the first aerator is reduced; and when the ratio of the COD to the nitrate nitrogen concentration rises back to 2.5 or more, the aeration rate of the first aerator is adjusted to rise to a preset value.

* * * * *